United States Patent
Koss et al.

(10) Patent No.: US 6,429,627 B1
(45) Date of Patent: Aug. 6, 2002

(54) VOLTAGE REGULATOR FOR A GENERATOR DRIVABLE BY AN INTERNAL COMBUSTION ENGINE

(75) Inventors: Thomas Koss, Reutlingen; Gerhard Fiedler, Neckartailfingen; Guenter Nasswetter, Gomaringen; Helmut Suelzle, Freiberg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,013
(22) PCT Filed: Mar. 27, 1999
(86) PCT No.: PCT/DE99/00933
§ 371 (c)(1),
(2), (4) Date: Dec. 19, 2000
(87) PCT Pub. No.: WO99/67870
PCT Pub. Date: Dec. 29, 1999

(30) Foreign Application Priority Data

Jun. 20, 1998 (DE) .......................................... 198 27 556

(51) Int. Cl.[7] .................................................. H02P 9/14
(52) U.S. Cl. .............................. 322/27; 322/25; 322/28
(58) Field of Search .............................. 322/25, 27, 28, 322/59

(56) References Cited

U.S. PATENT DOCUMENTS

| | | | | |
|---|---|---|---|---|
| 4,262,242 A | * | 4/1981 | Glennon ....................... 307/16 |
| 4,354,182 A | * | 10/1982 | Frey ............................. 322/99 |
| 5,023,540 A | * | 6/1991 | Walton et al. ................. 322/58 |
| 5,523,672 A | * | 6/1996 | Schramm et al. .............. 322/25 |
| 5,850,138 A | * | 12/1998 | Adams et al. ................. 322/68 |
| 6,163,138 A | * | 12/2000 | Kohl et al. .................... 322/25 |
| 6,218,814 B1 | * | 4/2001 | Kohl et al. .................... 322/19 |
| 6,351,104 B1 | * | 2/2002 | Koelle et al. ................... 322/22 |

FOREIGN PATENT DOCUMENTS

| | | |
|---|---|---|
| DE | 43 21 970 A | 1/1994 |
| DE | 196 38 357 | 9/1996 |
| EP | 0 421 332 A | 4/1991 |
| EP | 0 496 185 A1 | 7/1992 |
| EP | 0 611 215 A | 8/1994 |
| EP | 0 690 540 A | 1/1996 |
| EP | 0 751 602 A | 1/1997 |
| EP | 0 802 464 A | 10/1997 |
| EP | 0 872 950 A | 10/1998 |

* cited by examiner

*Primary Examiner*—Nicholas Ponomarenko
(74) *Attorney, Agent, or Firm*—Michael J. Striker

(57) ABSTRACT

A voltage regulator for a generator drivable by an internal combustion engine is proposed, in which the triggering of the end stage transistor for varying the exciter current is done with the aid of a pulse width modulator. The digital pulse width modulator employed is a component of a closed-loop control circuit for the exciter current, which uses the generator voltage as the actual value and regulates the pulse width ratio duty factor as a function of the generator voltage detected, and in addition a system damping is performed, in that one entire period of the duty factor can be turned off in overriding fashion. This overridingly turned-off period can be adapted in its duration to the duty factor, thus resulting in a voltage change that is independent of the duty factor. The maximum current rise rate can thus be limited by limiting the maximum rate of change of the pulse width modulator.

6 Claims, 2 Drawing Sheets

Actual duty factor 50%

VOLTAGE REGULATOR FOR A GENERATOR DRIVABLE BY AN INTERNAL COMBUSTION ENGINE

BACKGROUND OF THE INVENTION

The invention relates to a voltage regulator for a generator, drivable by an internal combustion engine.

PRIOR ART

It is known that when strong electrical consumers in an on-board motor vehicle electrical system are turned on, the generator is put under a heavy load. Since turning on such an electrical consumer causes a voltage collapse, the voltage regulator, by increasing the exciter current, seeks to increase the power output by the generator and to keep the output voltage of the generator essentially constant. As a result of proceeding in this way, the braking moment caused by the generator, which finally acts on the engine crankshaft, is increased, so that at low engine rpm, and especially during idling, an rpm collapse can occur.

To keep such an rpm collapse when strong electrical consumers are turned on as low as possible, in voltage regulators for generators in motor vehicles, provisions are made that are known by the term "load response".

In voltage regulators with a "load-response function", the exciter current after a strong consumer is turned on is increased not suddenly but rather continuously. For detecting the load turn-on, the ON duration of the regulating transistor is for instance evaluated. A voltage regulator for an internal combustion engine-driven generator that has both a load-response function and the evaluation of the exciter current duty factor is known for instance from German Published, Unexamined Patent Application DE-OS 196 38 357.

Another voltage regulator for an internal combustion engine-driven generator, which also has a limitation of the rise of the exciter current after a load turn-on, is known from European Patent Application 0 496 185 A1. In this known voltage regulator, both the actual value of the generator output voltage and the actual value of the exciter current are detected. As a function of these two detected values, a voltage regulation takes place that on the one hand keeps the rise in the exciter current after an electrical load has been turned on within predeterminable limits and on the other shifts these limits if the actual value of the generator output voltage drops off too sharply.

Both the known versions have the disadvantage that in the voltage regulator known from DE-OS 196 38 357 the reaction takes place only after a certain time, specifically not until the current rise has already occurred, while in the voltage regulator known from EP 0 496 185 A1, additional means are needed that detect the exciter current, and these means entail considerable expense in terms of circuitry for the sake of the requisite precision.

SUMMARY OF THE INVENTION

The voltage regulator according to the invention for a generator drivable by an internal combustion engine, having the characteristics of claim 1, has the advantage that the limitation in the exciter current rise rate after a strong electrical consumer is turned on is effected immediately, without requiring complicated means for measuring the exciter current. These advantages are obtained in that, in a voltage regulator the closed-loop control circuit for the exciter current is designed such that it includes a system with a digital pulse width modulator, which regulates the pulse width ratio as a function of the detected output voltage of the generator, and superimposed on this regulation is also a damping, which brings about an overriding turn-off of one period of the signal furnished by the pulse width modulator.

By means of this kind of voltage regulator, a regulation of the generator output voltage is attained that has high stability and leads to a regulated voltage with only very slight residual waviness. The so-called "load response", that is, the reaction to a load turn-on, can be compensated for in an especially advantageous way, which even makes it possible to reduce the exciter current rise rate to arbitrary values.

BRIEF DESCRIPTION OF THE DRAWING

One exemplary embodiment of the invention is shown in the drawing and will be described in further detail in the ensuing description. Individually.

DESCRIPTION OF THE PREFERRED EMBODIMENT

Figure 1:
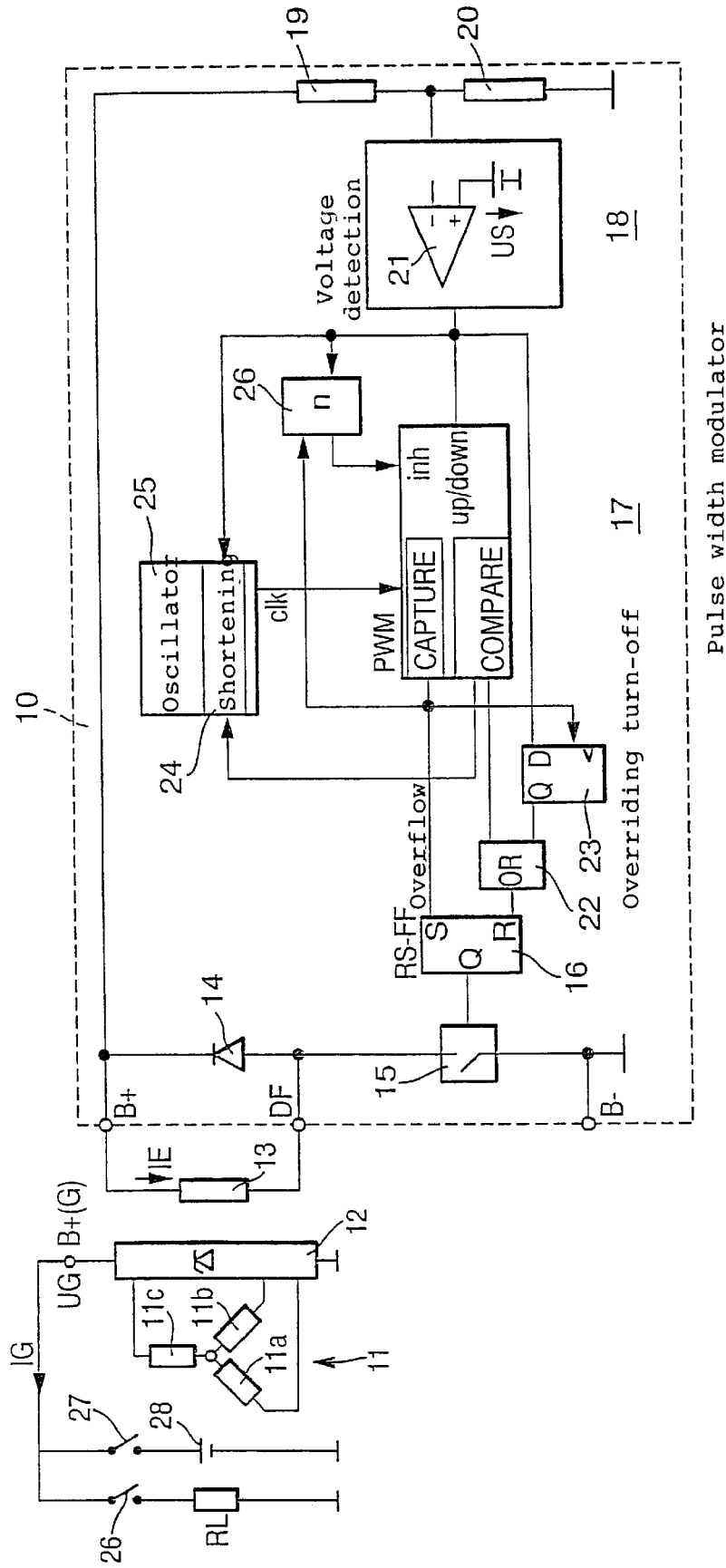
FIG. 1 is a block circuit diagram of a circuit arrangement according to the invention.

In FIG. 1, one exemplary embodiment of the invention is shown. Here 10 designates a voltage regulator, which regulates the output voltage UG of the generator 11, and this output voltage is rectified in the rectifier 11. The output voltage UG of the generator 11 is picked up at the generator terminal B+. The voltage regulator 10 includes the terminals B+, DF, and B−; B− is connected to ground. The exciter winding 13 of the generator is connected to the terminals B+ and DF, and the exciter current IE flows through the exciter winding 13. A free-wheel diode 14 is connected parallel to the exciter winding 13 and picks up the induced free-wheel current upon turn-off of the inductive load of the exciter winding 13.

The triggering of the exciter winding 13, or the regulation of the exciter current IE through the exciter winding 13, is done with the aid of the transistor power end stage 15. In the ON state, the transistor power end stage 15 connects the terminal DF to the terminal B−; an exciter current IE then flows via the exciter winding 13 to ground, thus in a known way generating a magnetic field, which induces a voltage in the generator windings 11a, 11b, 11c that is finally rectified to form the output voltage UG of the generator. The triggering of the transistor end stage 15 is done with the aid of logic components; the Q output of an RS flip-flop 16 triggers the transistor end stage 15. The triggering logic itself includes a pulse width modulator 17, which delivers a pulse width modulated trigger signal to the transistor end stage 15, and an actual value detector 18, which will be described in further detail below.

The actual value detector 18 is a voltage detector, which is in communication with the voltage divider having the resistors 19, 20 that is located between the regulator terminal B+ and ground. The actual value detector 18 includes at least one comparator 21, whose inverting input is in communication with the voltage divider 19, 20 and at whose noninverting input a voltage threshold value US is applied. With this actual value detector 18, a precise voltage detection can be performed, which is required to regulate the generator output voltage UG. As the output signal of the voltage detector, an up/down signal is created, which is low when the output voltage UG of the generator 11 is less than US, and which is high if UG is greater than US.

The output signal ascertained in the actual value detector 18 is delivered to the pulse width modulator 17. The pulse width modulator 17 is laid out as follows: The signal corresponding to the actual voltage UIst of the generator is delivered to an up/down input. A starting output marked "CAPTURE" leads to the SET input S of the RS flip-flop 16. A COMPARE output leads, via an OR gate 22, to the reset input R of the RS flip-flop 16. The starting output CAPTURE also leads to a D flip-flop 23, whose output is connected to the other input of the OR gate 22.

The COMPARE output of the pulse width modulator 17 also leads to a block 24 for shortening the period length or duration, which is a component of the oscillator 25 and furnishes clock pulses clk to the pulse width modulator. The actual voltage UIst is also delivered to the block 24. Both the actual voltage and the signal occurring at the CAPTURE output of the pulse width modulator are delivered to a further block 26. The block 26 prevents upward counting if an up signal is present. Block 26 is connected to one input inh of the pulse width modulator 17. The mode of operation of the entire arrangement will now be described.

The generator output voltage UG, which is a function of the exciter current IE and of the load resistance RL, is regulated via the exciter current IE in the exciter winding 13. To that end, it is known that the end stage transistor 15 is triggered. To reduce the power loss in the end stage transistor, the current regulation is done not in linear but rather clocked fashion. The load resistance RL is shown to represent the on-board electrical system and can be turned on via the switch 26. The battery 28 is charged by the generator 11 when the switch 27 is closed and assures the supply of current if the generator is incapable of outputting sufficient current. In the exemplary embodiment of the invention shown in FIG. 1, the closed-loop control circuit that triggers the end stage transistor 15 comprises a digital pulse width modulator 17, which is controlled by an up/down signal. This up/down signal is formed on the basis of the actual value of the generator output voltage. The actual value of the generator voltage is ascertained with the aid of the actual value detector 18.

The generator output voltage is compared with a set-point value US in the actual value detector 18, or in a comparator 21 of the actual value detector 18. In the exemplary embodiment of FIG. 1, the set-point value US is located at the non inverting input of the comparator 21, while the actual value is delivered to the inverting input of the comparator 21. At the output of the comparator 21, an up/down signal is generated; if the set-point value is undershot, an up signal is generated, and if the generator output voltage UG exceeds the set-point value, then a down signal is sent on to the pulse width modulator 17. If an up signal is applied to the up/down input of the pulse width modulator 17, then in each period of the duty signal of the pulse width modulator, the duty factor is increased by one increment. If a down signal is applied, then correspondingly the duty factor of the pulse width modulator is reduced by one increment.

Figure 2:
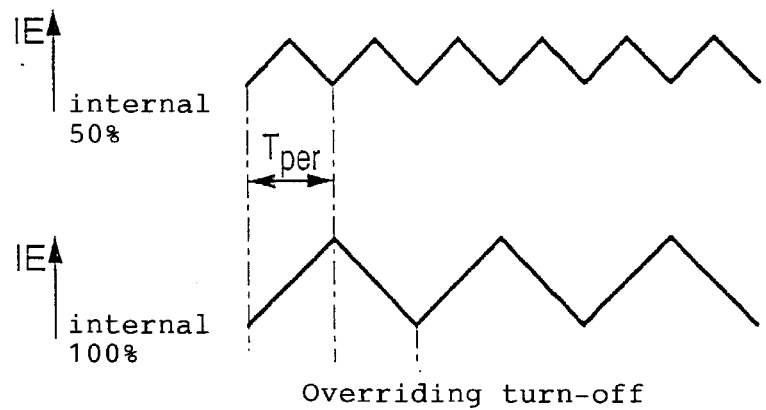
FIG. 2 shows duty factors of the pulse width modulation.

To prevent the output voltage UG of the generator 11 from fluctuating around the set-point value, the regulating system is damped so severely that if the set-point value is exceeded and accordingly if a down signal is applied at the up/down input of the pulse width modulator, the next period of the pulse width modulator is turned off in an overriding fashion. This prevents an overswing. As a result of this of this overriding turn-off, a further stable state exists for the closed-loop control circuit, in which state the internal duty factor of the pulse width modulator and external duty factor, which is present at the end stage, differ sharply from one another. In FIG. 2, for a real duty factor of 50%, internal duty factors of the pulse width modulator for 50% and 100% are shown; the overriding turn-off takes place at time ÜA, and the period length is Tper.

To make it possible to avoid this state shown in FIG. 2, after the transition from down to up (a down signal changes into an applied up signal), for n periods the increase in the duty factor is prevented, with the result that the duty factor of the pulse width modulator 17 rapidly, except for a residual imprecision approaches the duty factor actually required at the end stage transistor. The magnitude of the residual imprecision is dependent on the number n. The residual imprecision can thus be adapted to required conditions by the choice of the number n. The prevention of upward counting upon the application of an up signal is performed by block 26 by outputting a corresponding signal to the inh input of the pulse width modulator, and this is valid for n periods.

Figure 3:
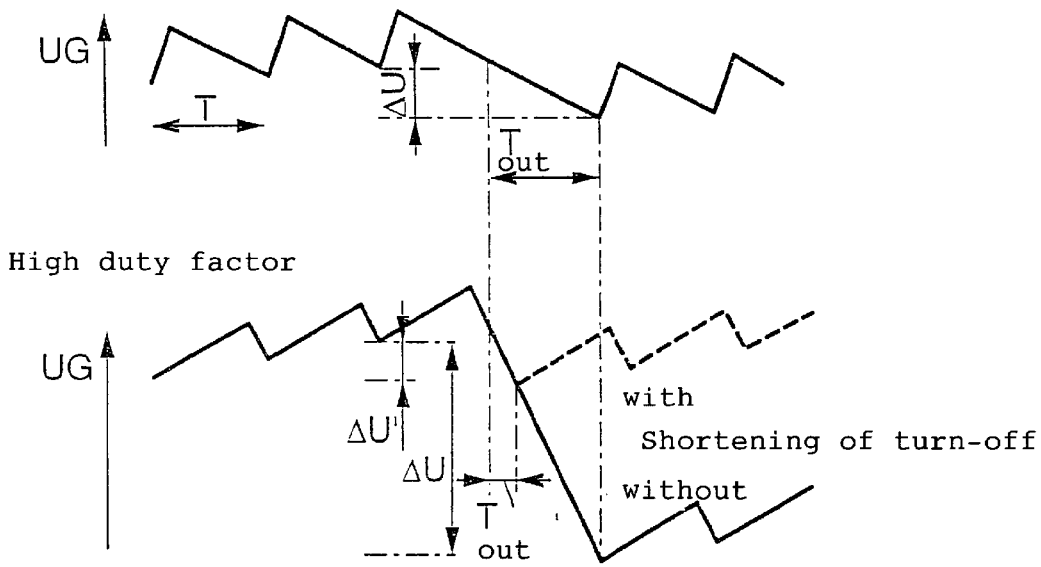
FIG. 3 shows the voltage course obtained for the generator output voltage, as an example for two different duty factors of the pulse width modulation.

By the overriding turn-off of one complete period of the duty factor of the pulse width modulator, a change in the exciter current IE and thus in the generator output voltage UG is effected, which change is sharply dependent on the current mean duty factor. To reduce this residual waviness, the overridingly turned-off period is adapted in terms of its length in such a way to the duty factor that a voltage change results which is independent of the duty factor. This situation is shown in FIG. 3; the voltage course is shown at a low duty factor and at a high duty factor. At a high duty factor, the voltage course is shown in dashed lines with turn-off shortening. Taus designates the period of time during which the overriding turn-off of the period length is operative, while $\Delta U$ and $\Delta U'$ are the resultant voltage difference.

Since the internal duty factor TPWM of the pulse width modulator 17 is virtually identical to the actually required duty factor TEND at the end stage that is required to achieve the set-point output voltage of the generator, a load turn-on performed that leads to a drop in the actual value of the voltage is now compensated for only to the extent permitted by the rate of change of the pulse width modulator. If the rate of change of the pulse width modulator is defined such that only every $m^{th}$ period upon the application of an up signal leads to an increase in the duty factor, then the rise rate of the exciter current can be limited and in principle reduced arbitrarily. A selectable current rise rate can be specified by specification of the number m.

The embodiment of the voltage regulator 10 according to the invention can be constructed as an integrated circuit.

What is claimed is:

1. A voltage regulator for a generator drivable by an internal combustion engine for regulating an on-board electrical system voltage for electrical consumers in motor vehicles, the voltage regulator comprising an exciter winding through which an exciter current flows which is varied so as to regulate an output voltage of the generator, so that a rise in the exciter current tripped when consumers are turned on is limited to predetermined values; a closed-loop control circuit for the exciter current and including a system with a digital pulse width modulator, which regulates a pulse width ratio of the exciter current by triggering a transistor power end stage by means of a pulse width modulated signal as a function of the detected output voltage of the generator; means for damping the system and cooperating in such a way with the pulse width modulator that at least one period of the pulse width modulated signal that is output is suppressed.

2. A voltage regulator as defined in claim 1, wherein said means for damping is formed so that a duration of a suppressed or a turned-off period of the pulse width modulated signal is variable, and a turn-off takes place in overriding fashion.

3. A voltage regulator as defined in claim 2, wherein said means for damping is formed so that a duration of an overridingly turned-off period is adapted to a duty factor of the pulse width modulator.

4. A voltage regulator as defined in claim 3, and further comprising a voltage divider, and a comparitor which provides a detection of an actual value of the output voltage of the generator by comparing a generator voltage delivered via the voltage divider to a set-point value and furnishing an output signal which is evaluated as an up/down signal in the pulse width modulator, and in each period in the pulse width modulator if an up signal is applied, the duty factor is increased by one increment, and if a down signal is applied, the duty factor is reduced by one increment.

5. A voltage regulator as defined in claim 4, wherein said comparitor is formed so that if the set-point value is exceeded and accordingly if the down signal is applied at the pulse width modulator, a next period of the signal applied to an end stage transistor is turned off.

6. A voltage regulator as defined in claim 2, and further comprising at least one D flip-flop, and an OR gate, realizing an overriding turning off of a period of the pulse width modulated signal.

* * * * *